July 8, 1969   J. L. ORNSTEIN   3,454,373
THERMOSTATIC COMPOSITE METAL LAYERS
Filed May 11, 1966
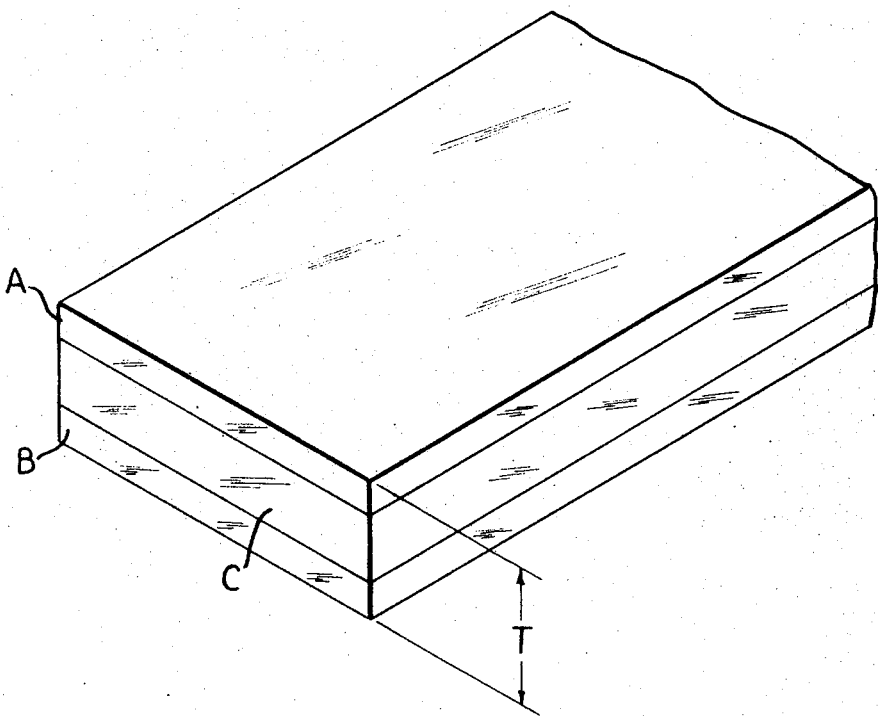
Jacob L. Ornstein,
Inventor.
Koenig, Senniger, Powers and Leavitt,
Attorneys.

United States Patent Office 3,454,373
Patented July 8, 1969

3,454,373
THERMOSTATIC COMPOSITE METAL LAYERS
Jacob L. Ornstein, Attleboro, Mass., assignor to Texas Instruments Incorporated, Dallas, Tex., a corporation of Delaware
Filed May 11, 1966, Ser. No. 549,328
Int. Cl. G01k 5/66; C22c 21/00, 35/00
U.S. Cl. 29—183.5                                5 Claims

ABSTRACT OF THE DISCLOSURE

A bonded trilayer thermostatic composite of alloys contains an electrical shunt layer of high titanium content having high restivity sandwiched between outer layers having comparatively high and low thermal coefficients of expansion, the composite having good weldability by conventional welding techniques, high fatigue strength and high corrosion resistance.

---

This invention relates to thermostatic materials and with regard to certain more specific features to such materials of the multilayered, composite type useful for the construction of thermostats and the like.

Among the several objects of the invention may be noted the provision of improved layered composite thermostatic materials having high electrical resistivity and moderate flexivity with improved weldability, corrosion resistance and fatigue strength; the provision of such composite materials incorporating an electrical shunt layer in connection with high- and low-expansion layers; and the provision of such composite materials for constructing thermostats and the like useful over wider temperature ranges and adapted to withstand higher temperatures than heretofore. Other objects and features will be in part apparent and in part pointed out hereinafter.

The invention accordingly comprises the products hereinafter described, the scope of the invention being indicated in the following claims.

In the accompanying drawing, the single figure illustrates one of various possible embodiments of thermostatic material made according to the invention. The drawing is not to scale, thicknesses being exaggerated for clear illustration.

The terms metal and alloy are used synonymously herein. Alloy formulations are to be understood as being given in percentages by weights of their constituents.

It has been known in the art of making thermostatic materials interfacially to bond two or more layers or components of various metals or alloys having relatively high and low thermal coefficients of expansion so that, upon heating, the resulting bonded composite flexes and hence may be used in the constructions of thermostats. Such constructions often employ weldments for attaching the thermostatic actuator part or parts therein. It is for making such thermostatic parts that the thermostat material of the invention is used. Heating for operation of a thermostat is often accomplished by passing electrical current through the layered composite constituting its temperature-responsive part. Therefore the resistivity of the composite forming this part is of importance in thermostat design. Preferably the resistivity of the composite should be substantial. Resistivity is defined as ohms per circular mil foot of a given material (abbreviated as O/c.m.f.).

The thermal activity in a given temperature range of a composite thermostatic material depends upon the ratio of the thicknesses of the components and the ratio of their moduli of elasticity. Such thermal activity is known as the flexivity of the composite. Flexivity is defined as a change in a curvature of a composite per unit of temperature change per unit of thickness.

Heretofore, a preferred bimetal combination of materials for composites used in making thermostats has been a high-expansion alloy for one layer having substantially a nominal composition of 72 Mn, 18 Cu, 10 Ni used in conjunction with a low-expansion alloy for the other layer, such as one having substantially a nominal composition of 36 Ni, 64 Fe. The term nominal means that a composition is within normal production tolerances. Although this former thermostatic composite exhibited desirable electrical and thermal properties, it had low fatigue strength caused by high stresses under unnecessarily high flexivity. In addition, it had poor corrosion resistance and poor weldability. The poor weldability and low corrosion resistance were attributed primarily to the above-mentioned alloy 72 Mn, 18 Cu, 10 Ni.

The present invention provides for a trimetal composite useful for making thermostats having a sandwiched shunt layer of high electrical resistivity and providing significantly superior weldability corrosion resistance and moderate flexivity, resulting in improved fatigue life. Moreover, the composite may be constructed with a substantial range of flexivities and resistivities according to layer thickness ratios.

Referring now more particularly to the drawing, it illustrates a trimetal composite made according to the invention, comprising outside metallic layers A and B which sandwich a central metallic layer C. These component layers in order to form the composite are interfacially bonded by any suitable means known to the art, such as, for example but without limitation, by solid-phase bonding by reduction as set forth in U.S. Patent 2,691,815. The total thickness T of the composite may be in the range of about .003 to .125 inch but this is not to be taken as limiting. Layer C may be referred to as a first layer and layers A and B as second and third layers, respectively.

Following are examples of how the composite may be constructed giving substantially the nominal formulations of preferable alloys forming its layers:

EXAMPLE I

High-coefficient layer A—14.65 Ni, 9.5 Mn, 5.1 Al, balance Fe
Shunt layer C—6 Al, 4 V, balance Ti
Low-coefficient layer B—36 Ni, 64 Fe.

The thicknesses of layers A, C and B may be made according to various percentages of the total thickness T of the composite. The following table shows the electrical resistivity and flexivity for each of three different layer thickness ratios for this Example I:

| Electrical Resistivity of composite O/c.m.f. | Flexivity of composite In 50°–200° F. range | Percentage of composite thickness T | | |
|---|---|---|---|---|
| | | Layer A | Shunt Layer C | Layer B |
| 700 | 100×10⁻⁷ | 26.7 | 46.6 | 26.7 |
| 800 | 85×10⁻⁷ | 15.3 | 69.4 | 15.3 |
| 900 | 50×10⁻⁷ | 6.4 | 87.2 | 6.4 |

EXAMPLE II

High-coefficient layer A—14.65 Ni, 9.5 Mn, 5.1 Al, balance Fe
Shunt layer C—6 Al, 4 V, balance Ti
Low-coefficient layer B—38 Ni, 7 Cr, balance Fe.

For the materials disclosed in this Example II, materials A, C and B may be made up of various percentages of the total thickness T of the composite according to the following table, which shows the electrical resistivity and flexivity for each of three different thickness ratios:

| Electrical resistivity of composite O/c.m.f. | Flexivity Of composite In 50°–200° F. range | Percentage of composite thickness T | | |
|---|---|---|---|---|
| | | Layer A | Shunt Layer C | Layer B |
| 700 | 89×10⁻⁷ | 33.2 | 33.4 | 33.2 |
| 800 | 68×10⁻⁷ | 19.0 | 62.0 | 19.0 |
| 900 | 30×10⁻⁷ | 7.9 | 84.2 | 7.9 |

As the examples indicate, it is preferable that layer C shall be approximately equal to or thicker than either of layers A and B. With increasing thickness of layer C, the resistivity of the composite increases and its flexivity decreases. The thicknesses of layers A and B are given as being equal for optimum activity, but their thicknesses in some cases may be made different for other than optimum activity. The choice of the high- and low-expansion alloy formulations for layers A and B, respectively, is based upon the large difference between their thermal coefficients of expansion and the substantial electrical resistivities of these alloys respectively. As regards both of the examples above given, alternatives for the alloy of the central shunt layer C is 8 Al, 1 Mo, 1 V, balance Ti, or 5 Al, 1½ Fe, 1½ Cr, 1.2 Mo, balance Ti. From the above it will be seen that one feature of the invention is the use of an alloy for the shunt layer C having a high content of titanium. Its resistivity per se is on the order of 1000 ohms per circular mil foot.

Materials fabricated according to the above examples can be welded by conventional techniques without difficulty. The materials are corrosion-resistant in normal or industrial atmospheres and may be subjected to acids without deterioration by intergranular or other corrosion. Due to their high strength and low thermal stress levels, the materials offer improved fatigue life, as compared with existing materials having similar electrical properties. They may be successfully applied where higher useful deflections are required over substantial temperature ranges, as well as for use under higher maximum temperatures than heretofore could be borne by the use of existing materials.

In view of the above, it will be seen that the several objects of the invention are achieved and other advantageous results attained.

As various changes could be made in the above products without departing from the scope of the invention, it is intended that all matter contained in the above description or shown in the accompanying drawing shall be interpreted as illustrative and not in a limiting sense.

What is claimed is:
1. A thermostatic metallic composite, comprising:
   a first layer composed of a first alloy;
   a second layer interfacially bonded to one face of said first layer and composed of a second alloy;
   a third layer interfacially bonded to the other face of said first layer and composed of a third alloy;
   said first alloy having an approximate composition selected from the group consisting of 6 Al, 4 V, balance Ti; 8 Al, 1 Mo, 1 V, balance Ti; 5 Al, 1½ Fe, 1½ Cr, 1.2 Mo, balance Ti;
   said second alloy having an approximate composition consisting of 14.65 Ni, 9.5 Mn, 5.1 Al, balance Fe;
   said third alloy having an approximate composition selected from the group consisting of 36 Ni, 64 Fe; 38 Ni, 7 Cr, balance Fe.
2. A composite according to claim 1, wherein the thickness of the first layer is substantially equal to or greater than the thickness of said second and third layers.
3. A composite according to claim 2, wherein the total thickness of the composite is in the range of approximately .003 to .125 inch.
4. A composite according to claim 1, wherein the percentage of the composite thickness of the respective layers is,
   as to the first layer in the range of approximately 33.4 to 87.2 percent,
   as to the second layer in the range of approximately 6.4 to 33.2 percent, and
   as to the third layer 6.4 to 33.2 percent.
5. A composite according to claim 4, wherein the total thickness of the composite is in the range of approximately .003 to .125 inch.

References Cited

UNITED STATES PATENTS

| 2,317,018 | 4/1943 | Alban | 29—195.5 |
| 2,470,753 | 5/1949 | Alban | 29—195.5 |
| 3,378,357 | 4/1968 | Alban | 29—195.5 |

FOREIGN PATENTS

| 669,555 | 8/1963 | Canada. |

HYLAND BIZOT, *Primary Examiner.*

U.S. Cl. X.R.

29—184, 195.5